(12) United States Patent
Ueda et al.

(10) Patent No.: US 7,491,446 B2
(45) Date of Patent: Feb. 17, 2009

(54) ANNULAR SLIDING FLUOROPLASTICS MEMBER, AND METHOD OF PRODUCING AN ANNULAR SLIDING FLUOROPLASTICS MEMBER

(75) Inventors: Takahisa Ueda, Sanda (JP); Terumasa Yamamoto, Sanda (JP)

(73) Assignee: Nippon Pillar Packing Co., Ltd., Yodogawa-ku, Osaka-ski, Osaka-fu (JP)

( * ) Notice: Subject to any disclaimer, the term of this patent is extended or adjusted under 35 U.S.C. 154(b) by 882 days.

(21) Appl. No.: 09/270,673

(22) Filed: Mar. 16, 1999

(65) Prior Publication Data
US 2004/0037984 A1    Feb. 26, 2004

(30) Foreign Application Priority Data
Mar. 23, 1998   (JP)   ................................. 10-074194

(51) Int. Cl.
*B32B 27/00*   (2006.01)
(52) U.S. Cl. ........................ 428/421; 428/105; 428/113; 428/297.4; 428/298.1; 428/299.7; 384/300
(58) Field of Classification Search ................. 428/421, 428/472, 105, 108, 113, 32, 295.1, 292.1, 428/296.2, 297.4, 298.1, 299.7; 384/300, 384/298, 908, 911, 909
See application file for complete search history.

(56) References Cited

U.S. PATENT DOCUMENTS

| | | | | |
|---|---|---|---|---|
| 3,000,076 A | * | 9/1961 | Runton et al. | .................. 28/80 |
| 3,675,980 A | * | 7/1972 | Stiff et al. | .................... 308/238 |
| 3,950,599 A | * | 4/1976 | Board, Jr. | .................... 428/236 |
| 4,540,630 A | * | 9/1985 | Wegner et al. | ............... 428/408 |
| 4,559,248 A | * | 12/1985 | Sumiyoshi et al. | ............ 428/36 |
| 4,847,135 A | * | 7/1989 | Braus et al. | .................. 428/138 |
| 4,942,075 A | * | 7/1990 | Hartel et al. | ................. 428/109 |

\* cited by examiner

*Primary Examiner*—Michael C Miggins
(74) *Attorney, Agent, or Firm*—Bacon & Thomas, PLLC (57) ABSTRACT

The present invention relates to an annular sliding fluoroplastics member which is requested to have good mechanical properties, resistance to abrasion and wear, thermal conductivity, heat resistance, and the like, and also to a method of producing such an annular sliding fluoroplastics member. The annular sliding fluoroplastics member of the invention has a composite structure which mainly consists of fluorine plastics and short fibers, and 20 or more wt. % of short fibers by weight of a total amount of the short fibers are oriented in a direction along which a burden of a load is large. According to this configuration, the buckling resistance and the pressure resistance are enhanced. A member having a high buckling resistance can be used in a thrust slide bearing or a thrust washer in which a large press load is applied in the axial direction, and a member having a high pressure resistance can be used in a radial slide bearing in which a large press load is applied in a radial direction. In some cases, in the annular sliding fluoroplastics member of the invention, filaments consisting of long fibers may be stitched to the inner peripheral face or the like, the surface is covered with an expanded graphite sheet, or the member is impregnated with a lubricant. The member having such a structure is excellent in buckling resistance and pressure resistance in a radial direction, and also in resistance to abrasion and wear, thermal conductivity, etc. According to the production method of the invention, a cutting work step can be omitted, and therefore materials can be prevented from being wastefully used, and the production cost can be reduced.

13 Claims, 7 Drawing Sheets

ANNULAR SLIDING FLUOROPLASTICS MEMBER, AND METHOD OF PRODUCING AN ANNULAR SLIDING FLUOROPLASTICS MEMBER

BACKGROUND OF THE INVENTION

1. Field of the Invention

The present invention relates to an annular sliding fluoroplastics member which is required to have good mechanical properties, resistance to abrasion and wear, thermal conductivity, hear resistance, and the like, and more particularly to an annular sliding fluoroplastics member which can be preferably used as a radial slide bearing, a thrust washer, or the like.

The present invention relates also to a method of producing an annular sliding fluoroplastics member which can produce such an annular sliding fluoroplastics member by means of simple steps.

2. Description of the Prior Art

As an annular sliding fluoroplastics member which is used as a radial slide bearing, a thrust slide bearing, a thrust washer, or the like, known are three types of annular sliding fluoroplastics members which will be described below.

An annular sliding fluoroplastics member of a first prior art example is molded by singly pressurizing and firing powder of granular fluoroplastics such as PTFE (Polytetrafluoroethylene) plastics.

An annular sliding fluoroplastics member of a second prior art example is molded by pressurizing and firing a complex which is obtained by dry mixing short fibers such as chopped aramid fibers or powder of plastics with PTFE plastics.

An annular sliding fluoroplastics member of a third prior art example is formed in the following manner. Short fibers made of fibrillated aramid plastics or the like, and PTFE plastics are uniformly wet mixed by, for example, a mixer. The wet mixed mixture is formed into sheet-like elements. A plurality of such sheet-like elements are stacked to form a layered structure. The layered structure is fixed and then subjected to various machining works such as a cutting work, to be formed into an annular shape.

The annular sliding fluoroplastics member of die first prior art example is excellent in resistance to abrasion and wear. In the member, however, thermal conductivity is poor in the case where the fluoroplastics and die counter member directly slide over eadi other to generate heat. Therefore, seizure easily occurs in the slide face, and hence it is difficult to maintain the sliding property stable for a long term.

In the annular sliding fluoroplastics member of the second prior art example, it often happens that the short fibers are not uniformly mixed. In such a case, high-density portions of short fibers and low-density portions of short fibers exist in a mixture in the slide face. In a low-density portion of short fibers, the sliding area between the fluoroplastics and the counter member is increased so that, in the same manner as the annular sliding fluoroplastics member of the first prior art example, the thermal conductivity of the low-density portion of the short fibers is lowered. As a result, seizure easily occurs in the slide face, and hence it is difficult to stably maintain the sliding property for a long term. In a thrust slide bearing and a thrust washer, since a large press load is applied in the axial direction, it is preferable to orient the short fibers in the axial direction along which the magnitude of the load is large, thereby enhancing the buckling resistance. By contrast, in a radial slide bearing, since a large press load is applied in a radial direction, it is preferable to orient the short fibers in a direction which is as close as possible to the radial direction so as to enhance the pressure resistance in a radial direction.

In the annular sliding fluoroplastics member of the second prior art example, however, the short fibers are randomly oriented, and hence the buckling resistance, and the pressure resistance in a radial direction are so low that the annular sliding member has a low mechanical strength.

The annular sliding fluoroplastics member of the third prior art example is produced by stacking plural sheet-like elements and cutting the resulting layered structure into an annular shape. Therefore, the production steps are complicated, and a large amount of chips must be disposed. As a result, the materials are wastefully used and the production cost is increased. Furthermore, most of the short fibers in the sheet-like elements are oriented substantially in one direction, and hence the orientation of the short fibers is restricted to a radial direction which is parallel to the radial direction, or is not always coincident with the direction along which the burden of a load is large. Therefore, it is difficult to employ the method in which the orientation of the short fibers is restricted so as to improve the buckling resistance, and the pressure resistance in a radial direction, thereby enhancing mechanical strength.

SUMMARY OF THE INVENTION

It is an object of the present invention to provide an annular sliding fluoroplastics member in which, while maintaining excellent resistance to abrasion and wear exerted by fluoroplastics, the mechanical strength such as the buckling resistance and the pressure resistance in a large load can be enhanced by short fibers mixed with the fluoroplastics.

It is another object of the present invention to provide an annular sliding fluoroplastics member which has good thermal conductivity so as to prevent seizure in a slide face between the member and a counter member from occurring, whereby the sliding property can be stably maintained of a long term.

It is a further object of the present invention to provide an annular fluoroplastics member which can omit a cutting work step from a production process, thereby preventing materials from being wastefully used, and reducing the production cost.

It is a still further object of the present invention to provide a method of producing such an annular sliding fluoroplastics member.

In order to attain the objects, the annular sliding fluoroplastics member of the present invention is characterized in that the member has a composite structure which mainly consists of flourine plastics and short fibers, and 20 or more wt. % of short fibers by weight of a total amount of the short fibers are oriented in a direction along which the magnitude of the load is large.

According to the present invention, a large ratio of the short fibers are oriented in the direction along which the magnitude of the load is large, so as to enhance the buckling resistance against a thrust load, and the pressure resistance in a radial direction against a radial load.

In the annular sliding fluoroplastics member of the present invention, when 20 or more wt. % of the short fibers by weight of the total amount of the short fibers may be oriented in an axial direction, a peripheral direction, or a spiral direction. Alternatively, 50 of more wt. % of the short fibers by weight of the total amount of the short fibers may be oriented in the direction along which the magnitude of the load is large. As the short fibers, fibrillated aramid fibers may be used. As the fluorine plastics, PTFE plastics may be used. In the annular sliding fluoroplastics member of the present invention, preferably, the composite structure is a structure in which a number of flourine layers containing the short fibers 2 are stacked in a radial direction, and each of the stacked layers has a wavy sectional shape which undulates in a axial direction. In the case, preferably, overlapping faces of the layers are integrally coupled to one another.

The annular sliding fluoroplastics member of the present invention, plural filaments may be stitched to the composite structure which mainly consists of the fluorine plastics and the short fibers. According to this configuration, resistance to wear is improved and mechanical strength is further enhanced by the reinforcing action of the filaments. As the filaments, preferably used are long fibers selected from aramid fibers, glass fibers, polyiniide fibers, and PTFE fibers which are stretched, or metal wired selected from stainless wires, aluminum, and copper wires.

In the annular sliding fluoroplastics member of the present invention, at least on surface of the annular sliding fluoroplastics member having the composite structure which mainly consists of the fluorine plastics and the short fibers may be covered with an expanded graphite sheet. In this structure, when the expanded graphite sheet is disposed in a slide face, the expanded graphite sheet slides over the counter member, and hence heat resistance is improved by the properties characteristic of an expanded graphite sheet. When the expanded graphite sheet is disposed in a face other that a slide face, such a that opposite toe the slide face, the sliding frictional heat generated into the slide face is radiated to a casing through the expanded graphite sheet, so that the sliding property is stably maintained for a long term.

In the annular sliding fluoroplastics member of the present invention, the annular sliding fluoroplastics member having the composite structure which mainly consists of the fluorine plastics and short fibers may be impregnated with lubricant. According to this configuration, the annular sliding member is provided with excellent resistance to abrasion and wear by the lubricating function of the lubricant, thereby improving the sliding property. When the annular sliding member is used in a place where a sealing function is required, permeation of a fluid is prevented from occurring, thereby enhancing sealing property.

In this way, according to the annular sliding fluoroplastics member of the present invention, when the annular sliding member is to be used as a thrust slide bearing of a thrust washer in which a large press load is applied in the axial direction, 20 or more wt. % of short fibers are oriented in an axial direction along which the magnitude of the load is large so as to enhance buckling resistance against a thrust load, whereby mechanical properties can be improved. When the annular sliding member is to be used as a radial slide bearing in which a large press load is applied in a radial direction, 20 or more wt. % of short fibers are oriented in a circumferential direction along which the magnitude of the load is so large so as to enhance pressure resistance in a radial direction against a radial load, whereby the mechanical properties can be improved. When 20 of more wt. % of short fibers are oriented in a spiral direction corresponding to an intermediate of the axial direction and the circumferential direction, the annular sliding member can be used as a thrust slide bearing, a thrust washer, or a radial slide bearing which has both the buckling resistance and the pressure resistance in a radial direction. Since 20 or more wt. % of short fibers which are oriented in a direction along which the magnitude of the load is large slide over the counter member, the resistance to abrasion and wear and thermal conductivity are improved, so that the sliding property is stably maintained for a long tein Moreover, a cutting work step can be omitted. Therefore, materials can be prevented from being wastefully used, and the production cost can be reduced.

The further detailed configuration and function of the annular sliding fluoroplastics member of the present invention will be more apparent from the following description of embodiments.

The method of producing an annular sliding fluoroplastics member of the present invention has the steps of: forming a mixture or fluorine plastics and short fibers into a sheet-like element; cutting out a tape-like element from the sheet-like element; spirally winding the cut out tape-like element to form an annular wound body; compressively deforming the wound body by pressurizing the wound body in an axial direction; during or after the deformation, heating the wound body to a temperature which is equal to or higher than a melt temperature of the fluorine plastics; and cooling the wound body to harden the wound body.

In the production method, a direction along which the tape-like element is cut out from the sheet-like element may be a direction which is perpendicular to the orientation of the short fibers, a direction which is parallel to the orientation of the short fibers, or a bias direction with respect to a rectangular sheet-like element. As the short fibers, fibrillated aramid fibers may be used. As the fluorine plastic, PTFE plastic may be used.

In the production method of the present invention, plural filaments may be stitched to the sheet-like element at intervals, and the tape-like element may be then cut out from the sheet-like element. In this case, as the filaments, preferably used are long fibers selected from aramid fibers, glass fibers, polyiniide fibers, and PTFE fibers which are stretched, or metal wires are selected from stainless wires, aluminum wires, and copper wires.

In the production method of the present invention, when of after the tape-like element is spirally wound, an expanded graphite sheet may be placed over at least one surface of the annular wound body to cover the surface with the expanded graphite sheet. The annular sliding fluoroplastics member which has been cooled and hardened may be inipregnated with lubricant.

The method of producing an annular sliding fluoroplastics member of the present invention will be more apparent from the following description of embodiments.

DETAILED DESCRIPTION OF THE PREFERRED EMBODIMENT

Figure 1:
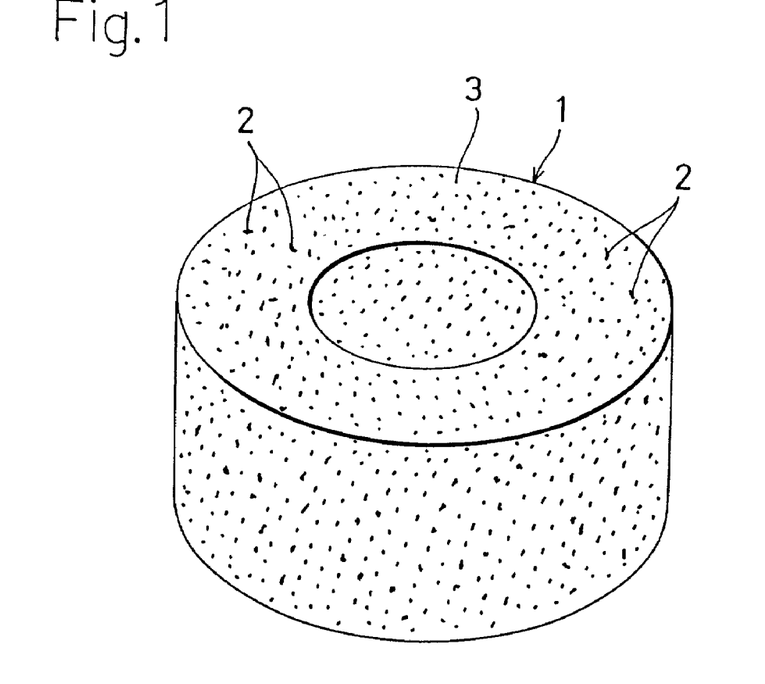
FIG. 1 is a perspective view showing a first embodiment of an annular sliding fluoroplastics member of the present invention.
Figure 2:
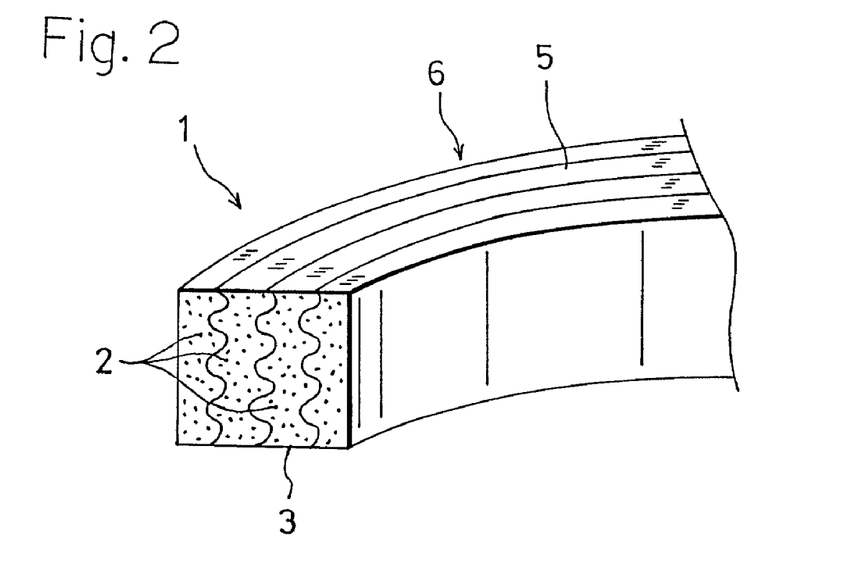
FIG. 2 is a partially cutaway enlarged perspective view showing the annular sliding fluoroplastics member of FIG. 1.

FIG. 1 shows an annular sliding fluoroplastics member 1 of a first embodiment. The annular sliding fluoroplastics member 1 consists of a fluoroplastics layer 3 containing short fibers 2 and is formed into an annular shape. As the short fibers 2, fibrillated aramid fibers may be preferably used. As fluorine plastics constituting the annular fluoroplastics layer 3, PTFE plastics may be preferably used. As shown in FIG. 2, the annular fluoroplastics layer 3 containing the short fibers 2 has a composite structure in which a number of layers are stacked in a radial direction, and each of the stacked layers is formed so as to have a wavy sectional shape which undulates in the axial direction. The fluoroplastics layer 3 of the multi-layer structure has been heated to a temperature at which the fluoroplastics layer 3 melts, so as to be fired. As a result of this firing process, the annular fluoroplastics layer 3 which has once melted generates a coupling force in a cooling and hardening step after the firing, so as to attain a state in which overlapping faces of the layers are integrally coupled to one another by the coupling force. Therefore, the interlayer coupling force is maintained to be large, so that the shape of the annular sliding fluoroplastics member 1 is hardly collapsed by layer separation. As a result, the shape formed in a production process can be maintained for a long term.

The annular sliding fluoroplastics member 1 shown in FIGS. 1 and 2 is produced in, for example, the following procedure. Hereinafter, an example in which fibrillated aramid fibers are used as the short fibers 2 and PTFE plastics is used as the fluorine plastics will be described.

Figure 4:
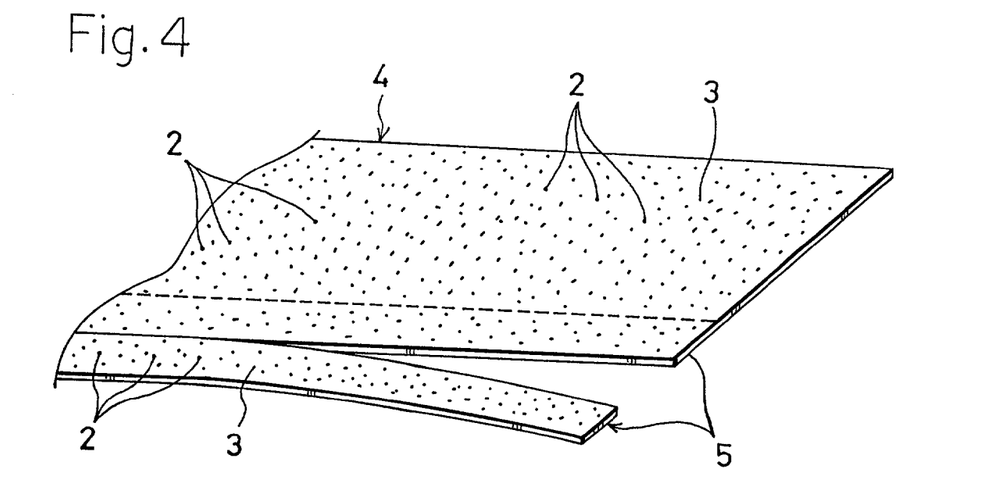
FIG. 4 is a perspective view showing a state of cutting out a tape-like element.
Figure 5:
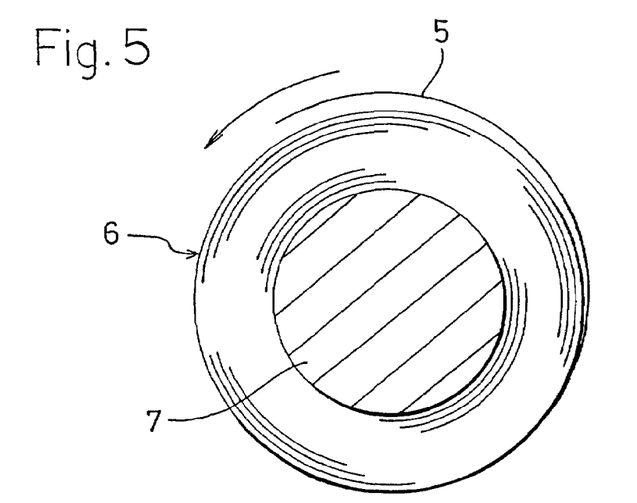
FIG. 5 is a side view showing a step of winding the tape-like element.
Figure 6:
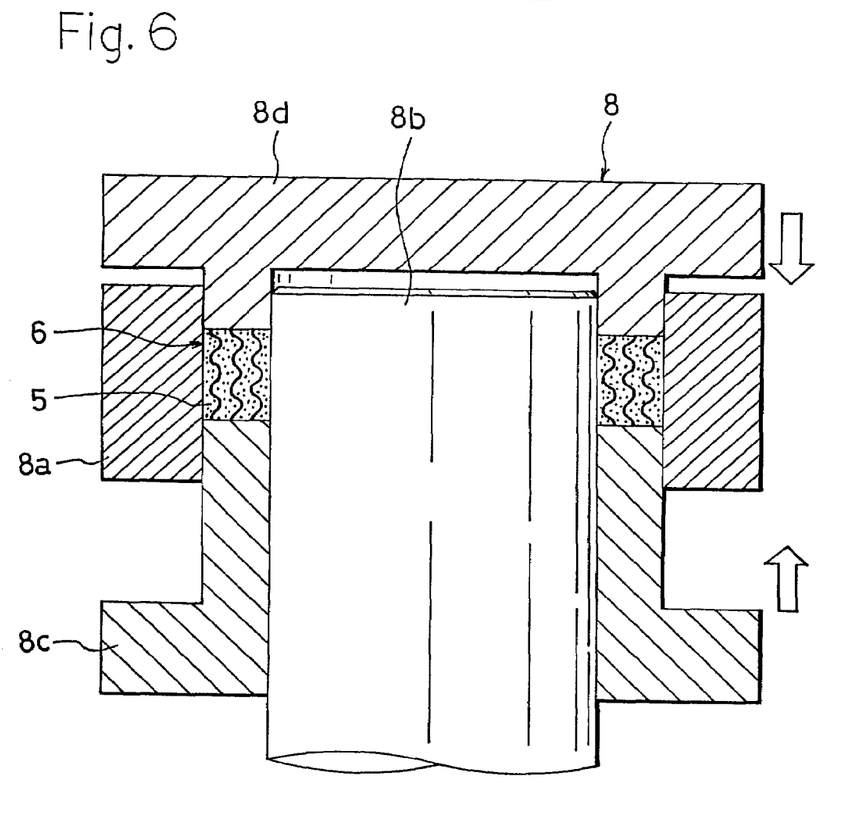
FIG. 6 is a section view showing a step of pressurizing the wound tape-like element.

Fibrillated aramid fibers and PTFE plastics (powder or granular) are uniformly wet-mixed by a mixer or the like. The wet-mixed mixture is formed into sheet-like elements by a sheet forming method, thereby producing a sheet-like element 4 shown in FIG. 3. A tape-like element 5 shown in FIG. 4 and having a given width is cut out from the sheet-like element 4. As shown in FIG. 5, the tape-like element 5 is spirally wound with a number of turns around the outer peripheral face of a shaft-shaped winding member (mandrel) 7, so as to form an annular wound body 6. As shown in FIG. 6, the annular wound body 6 is placed in an annular space defined by the inner periphery of a stationary metal piece 8a of a molding machine 8, the outer periphery of a core 8b, and a movable lower mold 8c. The annular wound body 6 is then pressed in the axial direction by the movable lower mold 8c and a movable upper mold 8d, so that the tape-like element 5 constituting the annular wound body 6 is compressively deformed into a wavy sectional shape which undulates in the axial direction.

During or after the deformation, the wound body is heated to be fired, to a temperature that is equal to or higher than 327° C. at which PTFE plastics melts. As a result of this firing, the PTFE plastics is caused to melt. The overlapping faces of the tape-like element 5 are integrally coupled to one another by a coupling force which is generated in a cooling and hardening step after the firing.

The annular sliding fluoroplastics member 1 of FIGS. 1 and 2 can be produced by the above-mentioned procedure, and hence it has the following advantages. Since the member is produced by spirally winding the tape-like element 5 which is cut out from the sheet-like element 4, steps of machining works such as a cutting work step can be omitted from the production process, whereby materials are prevented from being wastefully used and the production cost is reduced. Particularly, fibrillated aramid fibers have a property of easily tangling with one another, and therefore the sheet-like element 4 formed by the sheet forming process has a high mechanical strength, with the result that it is possible to obtain the annular sliding fluoroplastics member 1 having an excellent mechanical strength.

Figure 3:
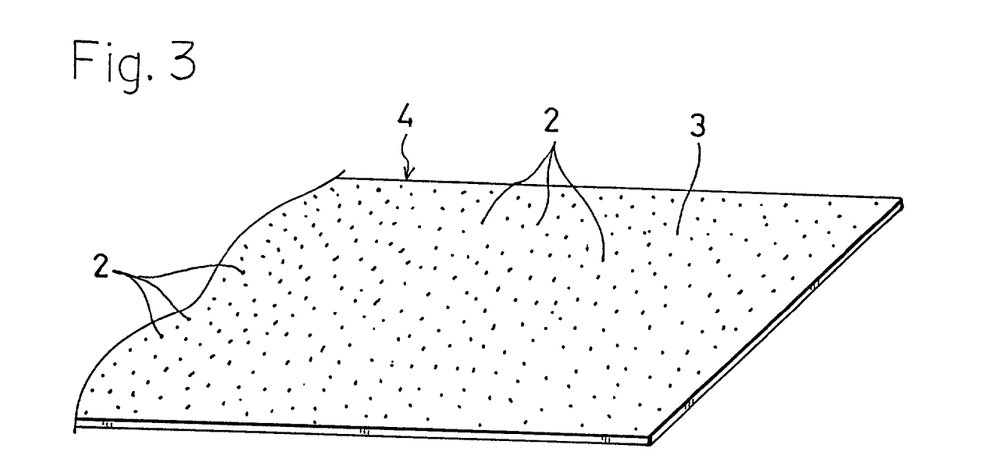
FIG. 3 is a perspective view showing a sheet-like element.
Figure 7:
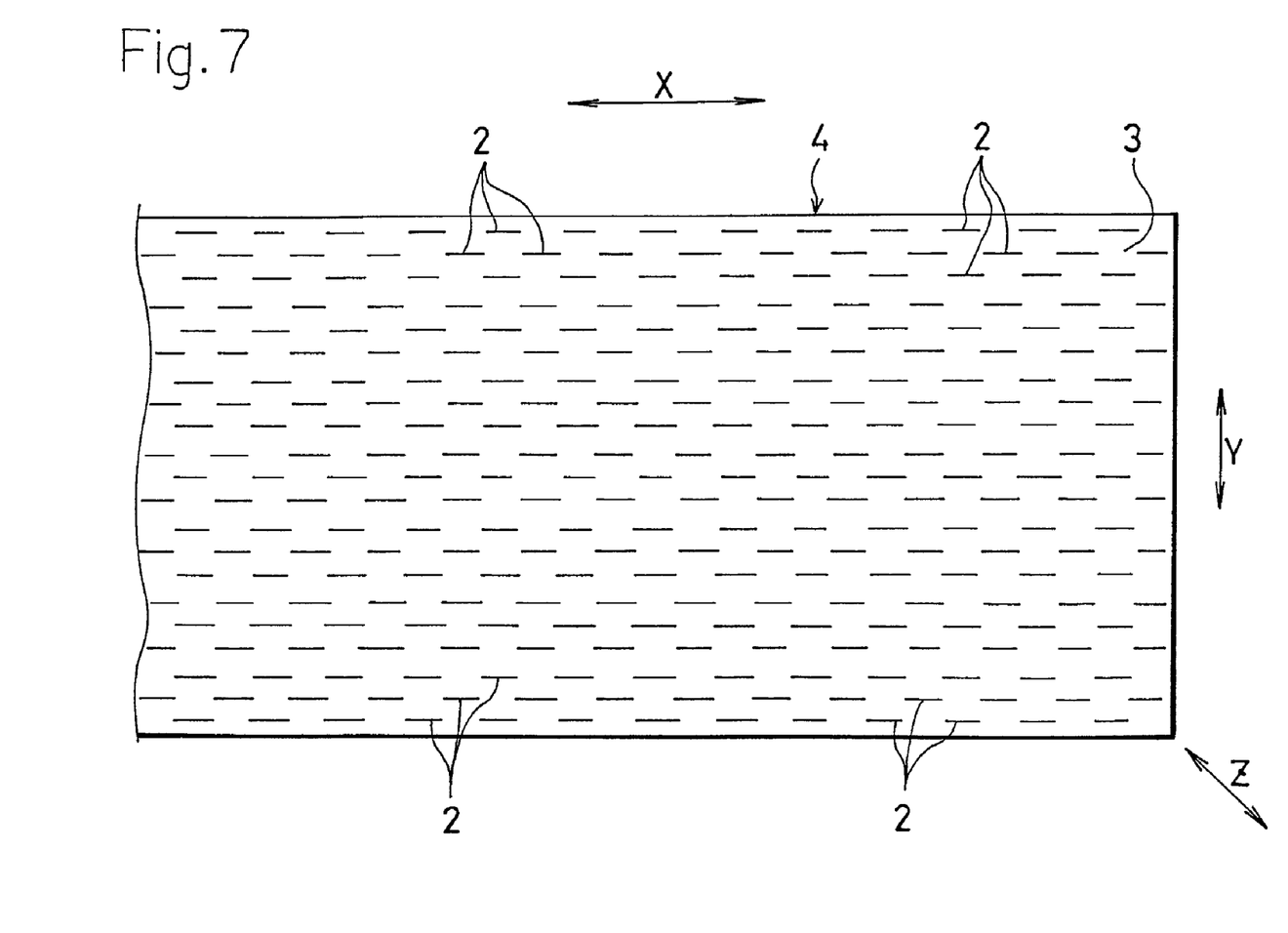
FIG. 7 is a diagrammatic plan view showing the orientation of short fibers of the wound tape-like element.

When the fibrillated short fibers 2 and the fluorine plastics such as PTFE plastics are uniformly wet mixed by a mixer and the wet-mixed mixture is formed by a sheet forming method into the sheet-like elements 4 shown in FIG. 3, the short fibers 2 in the ratio of (100:120) to (100:200), i.e., 83 to 50 wt. % of the short fibers 2 are oriented in the specific direction which is indicated by the arrow X of FIG. 7 and along which the sheet-like element 4 is wound up.

Figure 8:
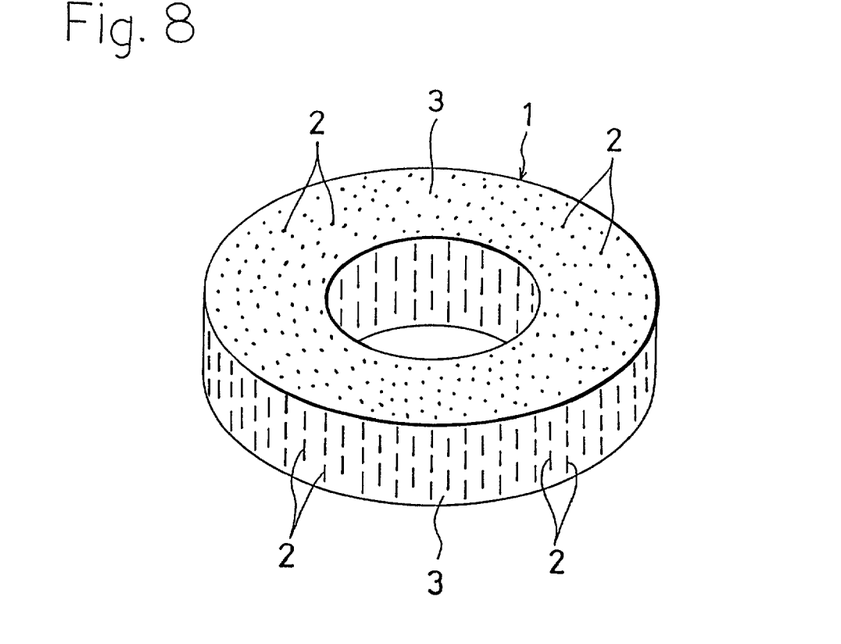
FIG. 8 is a perspective view showing an annular sliding fluoroplastics member having short fibers which are oriented in a direction adopted to a thrust slide bearing of a thrust washer.

From the sheet-like element 4 of FIG. 7, the tape-like element 5 of a given width is cut out in the direction of the arrow Y which is perpendicular to the orientation (the direction of the arrow X) of the short fibers 2. The tape-like element 5 is spirally wound with a number of turns to form the annular wound body 6. Thereafter, the pressurizing and firing processes are applied to the annular wound body. As a result, the annular sliding fluoroplastics member 1 in which many short fibers 2 are oriented in the axial direction as shown in FIG. 8 is produced. When many short fibers 2 are oriented in the axial direction in this way, the buckling resistance of the annular sliding fluoroplastics member 1 is enhanced. Consequently, the annular sliding member can be applied to a thrust slide bearing, a thrust washer, or the like in which a large press load is applied in the axial direction.

Figure 9:
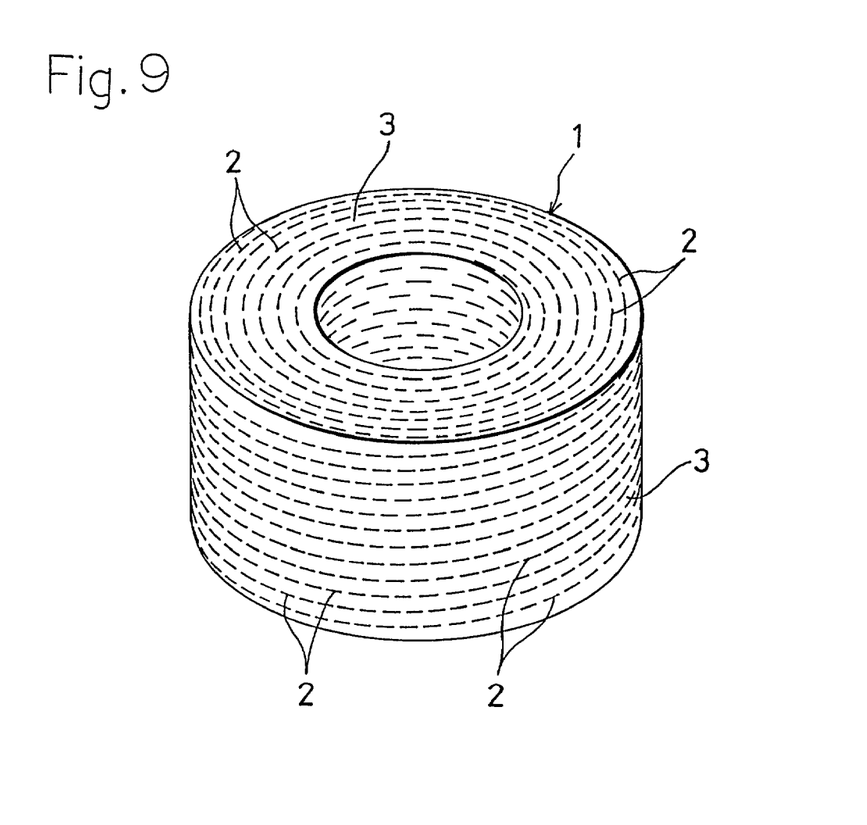
FIG. 9 is a perspective view showing an annular sliding fluoroplastics member having short fibers which are oriented in a direction adopted to a radial slide bearing.

By contrast, from the sheet-like element 4 of FIG. 7, the tape-like element 5 of a given width is cut out in the direction of the arrow X which is parallel to the orientation of the short fibers 2. The tape-like element 5 is spirally wound with a number of turns to form the annular wound body 6. Thereafter, the pressurizing and firing processes are applied to the annular wound body. As a result, the annular sliding fluoroplastics member 1 in which many short fibers 2 are oriented in the circumferential direction as shown in FIG. 9 is produced. When many short fibers 2 are oriented in the circumferential direction in this way, the pressure resistance in a radial direction of the annular sliding fluoroplastics member 1 is enhanced. Consequently, the annular sliding member can be applied to a radial slide bearing in which a large press load is applied in a radial direction.

Figure 10:
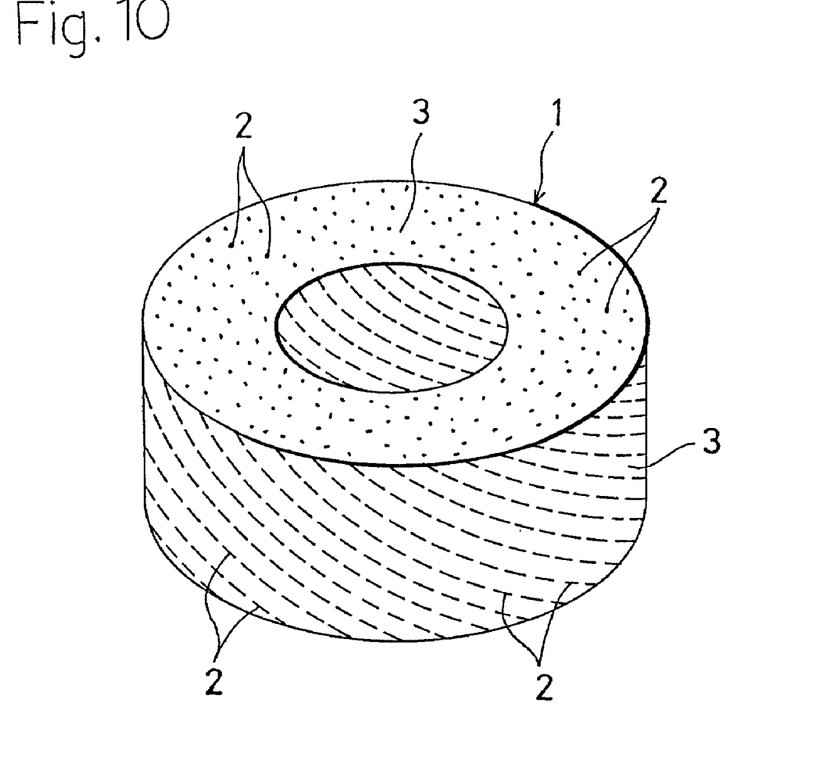
FIG. 10 is a perspective view showing an annular sliding fluoroplastics member having short fibers which are oriented so as to attain both buckling resistance and pressure resistance in a radial direction.

Furthermore, from the rectangular sheet-like element 4 of FIG. 7, the tape-like element 5 of a given width is cut out in the direction of the arrow Z (the bias direction) which obliquely crosses with the orientation (the direction of the arrow X) of the short fibers 2. The tape-like element 5 is spirally wound with a number of turns to form the annular wound body 6. Thereafter, the pressurizing and firing processes are applied to the annular wound body. As a result, the annular sliding fluoroplastics member 1 in which the short fibers 2 are oriented in a spiral direction as shown in FIG. 10 is produced. According to this configuration, it is possible to provide the annular sliding fluoroplastics member 1 which has both buckling resistance and pressure resistance in a radial direction.

The ratio of the short fibers 2 which are oriented in the axial, circumferential, or spiral direction along which the magnitude of the load is large is requested to be 20 or more wt. % by weight of the total amount of the short fibers 2. When the ratio of the short fibers 2 which are oriented in the axial or circumferential direction is smaller than 20 wt. %, the ratio of random orientations is increased and the buckling resistance or the pressure resistance in a radial direction is reduced. In the case where a higher mechanical strength is required, it is preferable to set the orientation ratio of the short fibers 2 to be 50 or more wt. %.

Figure 11:
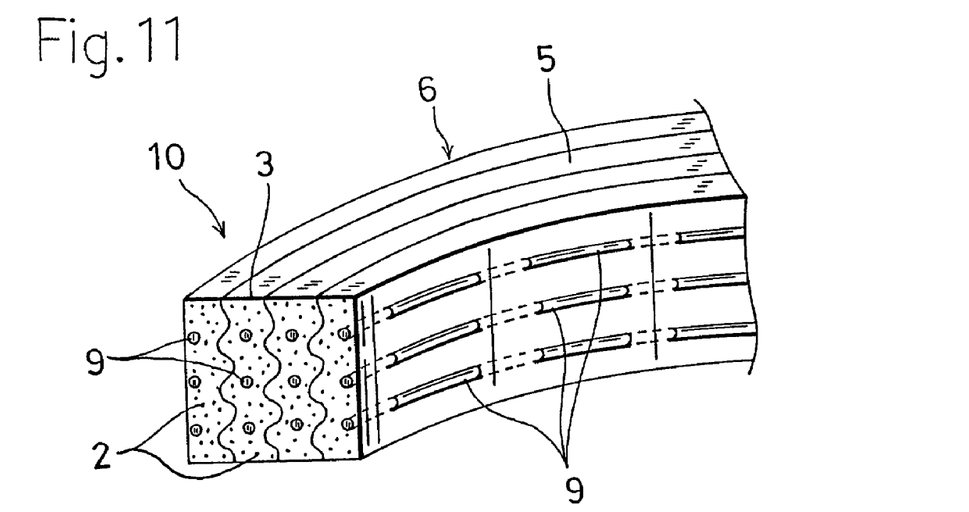
FIG. 11 is a partially cutaway enlarged perspective view showing a second embodiment of the annular sliding fluoroplastics member of the present invention.

FIG. 11 shows an annular sliding fluoroplastics member 10 of a second embodiment. The annular sliding fluoroplastics member 10 is configured by winding the tape-like element 5 to which plural filaments 9 are stitched.

The annular sliding fluoroplastics member 10 can be produced in the following manner. The plural filaments 9 are stitched at appropriate intervals to a flat portion of the sheet-like element 4 which is formed into a sheet-like shape as that of the first embodiment, in a direction which is parallel or perpendicular to, or in a biased manner with the orientation of the short fibers 2. The tape-like element 5 of a given width is cut out from the sheet-like element 4. The tape-like element 5 is spirally wound with a number of turns to form the annular wound body 6. The pressurizing and firing processes are then applied to the annular wound body, thereby producing the member.

The annular sliding fluoroplastics member 10 to which the plural filaments 9 are stitched as shown in FIG. 11 can attain the effect that the resistance to wear is improved by the reinforcing action of the filaments 9, in addition to the effects of the first embodiment. Consequently, mechanical strength is further enhanced.

As the filaments 9, preferably used are long fibers such as aramid fibers, glass fibers, polyimide fibers, or PTFE fibers which are stretched, or metal wires such as stainless wires, aluminum wires, or copper wires.

Figure 12:
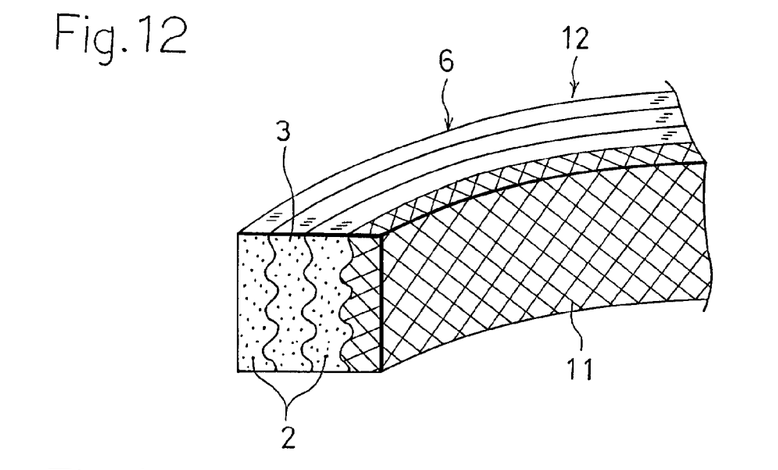
FIG. 12 is a partially cutaway enlarged perspective view showing a third embodiment of the annular sliding fluoroplastics member of the present invention.

FIG. 12 shows an annular sliding fluoroplastics member 12 of a third embodiment. In the annular sliding fluoroplastics member 12, the inner peripheral face of the annular wound body 6 constituting the first or second embodiment is covered with an expanded graphite sheet 11. The annular sliding fluoroplastics member 12 can be produced in the following manner. When or after the tape-like element 5 of the first or second embodiment is wound, the pressurizing and firing processes are applied to the annular wound body 6 while the expanded graphite sheet 11 is kept to be placed over the inner peripheral face of the annular wound body, thereby causing the fluorine plastics 3 (for example, PTFE plastics) to melt. By means of a coupling force which is generated in a hardening step of the fluorine plastics 3, the whole periphery of the inner peripheral face of the annular sliding fluoroplastics member 12 is covered with the expanded graphite sheet 11, thereby producing the annular sliding member. When the annular sliding fluoroplastics member 12 is used as a radial slide bearing while covering the whole periphery of the inner peripheral face of the annular sliding fluoroplastics member 12 with the expanded graphite sheet 11, the expanded graphite sheet 11 slides over a rotation shaft. Therefore, the heat resistance of the annular sliding fluoroplastics member 12 is improved by the properties characteristic to the expanded graphite sheet 11, so that the sliding property can be stably maintained for a long term.

Figure 13:
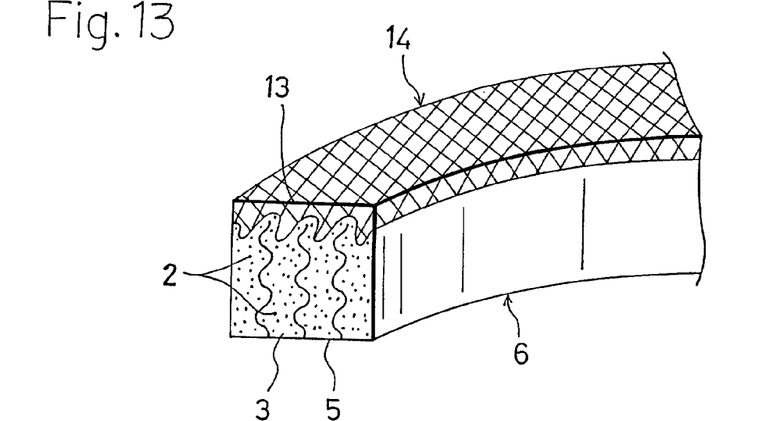
FIG. 13 is a partially cutaway enlarged perspective view showing a modification of the third embodiment of the annular sliding fluoroplastics member of the present invention.

FIG. 13 shows a modification of the third embodiment. In the annular sliding fluoroplastics member 14, one end face in the axial direction of the annular wound body 6 is covered with an expanded graphite sheet 13. The annular sliding fluoroplastics member 14 can be produced in the following manner. When or after the tape-like element 5 of the first or second embodiment is wound, the pressurizing and firing processes are applied to the annular wound body 6 while the expanded graphite sheet 13 is kept to be placed over the one end face in the axial direction of the annular wound body, thereby causing the tetrafluoride ethylene plastics 3 to melt. By means of a coupling force which is generated in a hardening step of the tetrafluoride ethylene plastics 3, the whole of the one end face in the axial direction of the annular sliding fluoroplastics member 14 is covered with the expanded graphite sheet 13, thereby producing the annular sliding member. When the annular sliding fluoroplastics member 14 is used as a thrust slide bearing or a thrust washer while covering the whole of the one end face in the axial direction of the annular sliding fluoroplastics member 14 with the expanded graphite sheet 13, the expanded graphite sheet 13 slides over a thrust bearing. Therefore, the heat resistance of the annular sliding fluoroplastics member 14 is improved by the properties characteristic to the expanded graphite sheet 13, so that the sliding property can be stably maintained for a long term.

In the annular sliding fluoroplastics member 12 of FIG. 12, the inner peripheral face is covered with the expanded graphite sheet 11. Alternatively, both the inner and outer peripheral faces or one face other than the slide face may be covered with the expanded graphite sheet 11. In the annular sliding fluoroplastics member 14 of FIG. 13, one end face in the axial direction is covered with the expanded graphite sheet 13. Alternatively, both the end faces in the axial direction may be covered with the expanded graphite sheet 13. In other words, at least one surface of the annular sliding fluoroplastics member is requested to be covered with an expanded graphite sheet.

Figure 14:
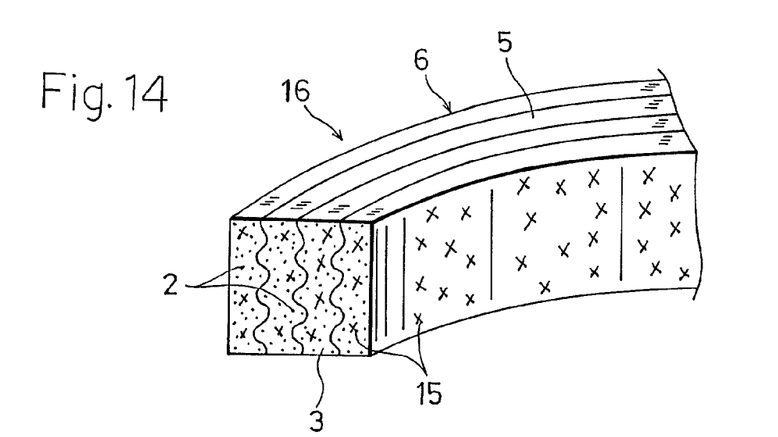
FIG. 14 is a partially cutaway enlarged perspective view showing a fourth embodiment of the annular sliding fluoroplastics member of the present invention.

FIG. 14 shows a fourth embodiment. The annular sliding fluoroplastics member 16 corresponds to a member which is obtained by impregnating the annular sliding fluoroplastics member 1 of the first embodiment with a lubricant 15. The annular sliding fluoroplastics member 16 is provided with excellent resistance to abrasion and wear by the lubricating function of the lubricant 15, thereby improving the sliding property. When the annular sliding fluoroplastics member 16 is used in a place where a sealing function is required, permeation of a fluid is prevented from occurring, thereby enhancing the sealing property. As the lubricant 15, useful is wax, synthetic oil such as fluorine oil or silicone oil, or mineral oil such as paraffin oil.

The entire disclosure of Japanese Patent Application No. 10-74194 filed on Mar. 23, 1998 including specification, claims, drawings and summary are incorporated herein by reference in its entirety.

What is claimed is:

1. An annular sliding fluoroplastics member having a composite structure containing a plurality of layers stacked in a radial direction and coupled to one another, wherein: each layer includes fluorine plastic and short fibers; and wherein 20 or more wt. % of said short fibers by weight of a total amount of said short fibers are oriented in a direction along which the magnitude of a load is large.

2. An annular sliding fluoroplastics member according to claim 1, wherein 20 or more wt. % of the short fibers by weight of the total amount of said short fibers are oriented in an axial direction of said annular sliding fluoroplastics member.

3. An annular sliding fluoroplastics member according to claim 1, wherein 20 or more wt. % of the short fibers by weight of the total amount of said short fibers are oriented in a circumferential direction of said annular sliding fluoroplastics member.

4. An annular sliding fluoroplastics member according to claim 1, wherein 20 or more wt. % of the short fibers by weight of the total amount of said short fibers are oriented in a spiral direction of said annular sliding fluoroplastics member.

5. An annular sliding fluoroplastics member according to claim 1, wherein 50 or more wt. % of the short fibers by weight of the total amount of said short fibers are oriented in a direction along which the magnitude of a load is large.

6. An annular sliding fluoroplastics member according to claim 1, wherein said short fibers are fibrillated aramid fibers, and said fluorine plastics is PTFE plastics.

7. An annular sliding fluoroplastics member according to claim 1, wherein at least one surface of said annular sliding fluoroplastics member having said composite structure which mainly consists of said fluorine plastics and said short fibers is covered with an expanded graphite sheet.

8. An annular sliding fluoroplastics member according to claim 1, wherein said annular sliding fluoroplastics member having said composite structure which mainly consists of said fluorine plastics and said short fibers is impregnated with a lubricant.

9. An annular sliding fluoroplastics member according to claim 1, wherein each layer is coupled so that the layers do not move relative to each other in the axial direction.

10. An annular sliding fluoroplastics member according to claim 1, wherein each of said stacked layers has a wavy sectional shape which undulates in an axial direction of said annular sliding fluoroplastics member.

11. An annular sliding fluoroplastics member according to claim 10, wherein overlapping faces of said layers are integrally coupled to one another.

12. An annular sliding fluoroplastics member according to claim 1, wherein plural filaments are stitched to said composite structure which mainly consists of said fluorine plastics and said short fibers.

13. An annular sliding fluoroplastics member according to claim 12, wherein, as said filaments, long fibers selected from aramid fibers, glass fibers, polyimide fibers, and PTFE fibers which are stretched, or metal wires selected from stainless wires, aluminum wires, and copper wires are used.

* * * * *